United States Patent Office 3,366,700
Patented Jan. 30, 1968

3,366,700
PROCESS FOR THE PRODUCTION OF CIS-TRANS-CYCLODODECADIENES-(1,3).
Willi Ziegenbein and Wolfgang M. Schneider, Marl, Germany, assignors to Chemische Werke Huls Aktiengesellschaft, Marl, Germany
No Drawing. Filed Jan. 26, 1965, Ser. No. 428,213
Claims priority, application Germany, Feb. 7, 1964,
C 32,074
10 Claims. (Cl. 260—666)

The present invention relates to the production of cis-trans-cyclododecadiene-(1,3). More particularly, it relates to the production of cis-trans-cyclododecadiene-(1,3) by heating to 300–650° C. a diester of cyclododecanediol-(1,2) and a monocarboxylic acid containing from 1 to 12 carbon atoms.

The prior art (U.S. Patent 3,093,693) shows the reaction of cyclododecene with N-bromosuccinimide to obtain 3-bromo-cyclododecene followed by reaction of the latter with a dehydrobrominating agent, such as quinoline, to produce trans-trans-cyclododecadiene-(1,3).

The prior art (Helv. Chim. Acta 46 (1963) 483) also shows that cyclodecadiene-(1,5) is thermally almost completely converted at relatively low temperatures into divinylcyclohexane.

It is also known (British Patent 937,276) that cyclododecatriene-(1,5,9) can be thermally converted into trivinyl-cyclohexane and that cycloolefins under similar conditions produce $\alpha,\omega$-diolefins with opening of the ring.

In view of the above knowledge it was entirely unexpected when it was discovered, according to the present invention, that cyclododecene-ol-monoester, which is first produced in the operation of the present invention, would without opening of the ring produce good yields of cis-trans-cyclododecadiene-(1,3). On the basis of the prior knowledge concerning this type of reaction the opening of the ring and the production of entirely different compounds were expected.

In carrying out the procecss of the present invention diesters suitable for use include diesters such ac cyclododecane-diol-(1,3)-bis-propionate, -butyrate, -valerate, -caproate and -laurate. Cyclododecane-diol-(1,2)-bis-acetate produced, for example, by the reaction of cyclododecane-diol-(1,2) with acetic acid anhydride, is particularly suitable for use in the process. These diesters can be produced in the usual manner by known esterification processes.

The process can likewise be satisfactorily carried out without using preformed diesters, by using mixtures of cyclododecane-diol-(1,2) and an excess of a monocarboxylic acid containing 2 to 12 carbon atoms, or, if preferred, an anhydride thereof, such as acetic anhydride propionic anhydride, etc. In reacting such mixtures, it is preferred to use 2 to 3 moles of the anhydride, such as acetic acid anhydride, per mole of cyclododecane-diol-(1,2), although ratios as high as 1.5 to 4 moles can be conveniently used.

Instead of starting with the diester it is possible to start with a monoester of the desired compound, that is, with the cyclododecene-ol-monoester, which is first produced in the pyrolysis of the said diesters of cyclododecane-diol-(1,2).

The cyclododecane-diol used in the process of the present invention can be readily obtained in high yield by acid hydrolysis of cyclododecene oxide, which can be produced in turn by monoepoxidization of cyclododecatriene-(1,5,9) followed by hydrogenation of the remaining double bond.

The production of cis-trans-cyclododecadiene-(1,3) by the process of the present invention can readily be effected at temperatures ranging from 300 to 650° C., and preferably between 450 to 550° C. It is desirable to carry out the reaction under reduced pressures ranging from 0.01 to 760 torr, and preferably between 1 and 40 torr. By employing reduced pressures the formation of polymers and side reactions are substantially completely eliminated. It is preferred also to carry out the reaction in the presence of an inert gas, such as, for example, nitrogen or other gas which is inert under the conditions of the reaction. The reaction is preferably effected in a quartz, ceramic, or special steel reaction vessel, preferably in the form of a tube, and filled with ceramic or other inert solid bodies.

In, for example, carrying out the process in a continuous manner, the diester or the mixture of cyclododecane-diol-(1,2) and the excess of carboxylic acid or carboxylic acid anhydride, is placed in a distillation column from the head of which the cyclododecadiene-(1,3), together with the excess of carboxylic acid or carboxylic acid anhydride, distills off, while any of the starting materials which may not have reacted, or any product of incomplete pyrolysis such as the cyclododecene-ol-monoester, is withdrawn from the sump of the column, and together with fresh diester or mixture of cyclododecane-diol-(1,2) and carboxylic acid or carboxylic acid anhydride, is returned to the reaction space.

The mixture of cyclododecadiene-(1,3) and carboxylic acid or carboxylic acid anhydride removed from the reactor is first washed with water and then with alkaline liquids, preferably with dilute lyes, such as aqueous sodium carbonate or bicarbonate, and the organic component then distilled under reduced pressure. The acids thus recovered can then be used for additional esterification of cyclododecane-diol. If preferred, it is also possible to first separate the acids by distillation and then to subject the cyclododecadiene-(1,3), if necessary, to an alkaline washing.

The following examples are given for the purpose of illustrating the invention. It is understood, however, that various modifications of the specific examples described can be made by one skilled in the art. Such modifications, however, which do not depart from the concept of the invention are intended to be covered by the appended claims.

*Example 1*

A stationary upright quartz tube 1 meter in length and 5 cm. in diameter was filled with ceramic bodies, flushed with nitrogen gas and heated to approximately 500° C., and the pressure in the tube reduced to 20 torr. A capillary tube extending into an atmosphere of nitrogen insured the maintenance of an atmosphere of nitrogen in the tube. While maintaining the tube under these conditions, 656 g. (2.4 mols) of melted cyclododecane-diol-(1,2)-bis-acetate (M.P. 62° C., B.P.$_{0.7}$ 130–132° C.), produced by acetylation of cyclododecane-diol-(1,2) with acetic acid anhydride, were added dropwise over a period of six hours. The product from the reactor was collected in an ice receiver and then transferred to another receiver cooled to −30° C. The collected reaction products were combined, mixed with an equal amount of ether, and then washed free from acid, first with water and then with dilute sodium bicarbonate solution. After drying the organic phase with sodium sulfate, the ether was removed by distillation and the residue fractionated under vacuum. A yield of 59 g. of a preliminary product (B.P.$_{.4}$ 86–96° C.) consisting principally of unsaturated aliphatic hydrocarbons, 141 g. of cis-trans-cyclododecadiene-(1,3), 143 g. of cyclododecene-(1)-ol-(3)-acetate ($n_D^{20}$=1.4825) and 150 g. of unchanged starting material was obtained. Taking the latter unreacted material into consideration, the yield was 48% of the theoretical cyclododecadiene-(1,3). Since, as shown in Example III below, the cyclododecene-(1)-ol-(3) is convertible into cyclododecadiene-(1,3) with a yield of 46%, the actual yield of the desired material amounted to 61% of the desired cis-trans-cyclododecadiene-(1,3).

During redistillation of a sample in a rotating band column the cyclododecadiene-(1,3) passed over at 85° C./3 torr: $n_D^{20}=1.5194$. Gas chromatography showed the product to be a single compound. The IR spectrum showed strong absorption at 10.18 (982 cm.$^{-1}$), corresponding to a trans-double bond, and at 14.22 (708 cm.$^{-1}$), corresponding to a cis-double bond. The absorption intensities were in the expected relationship. By heating the cis-trans-cyclododecadiene-(1,3) with maleic anhydride in toluene a crystalline diene product (decomposition point about 190° C.) which was difficultly soluble in petroleum ether was obtained.

*Example II*

Using the same apparatus described in Example I, 100 g. of cyclododecane-diol-(1,2)-diacetate were heated at 550° C. and at 20 torr pressure for a period of 1 hour. Distillation of the resulting reaction product after being washed free from acids gave:

12.1 g. of unsaturated aliphatic hydrocarbons
32.9 g. of cis-trans-cyclododecadiene-(1,3)
9.8 g. of cyclododecene-(1)-ol-(3)-acetate
8.1 g. of cyclododecane-diol-(1,2)-diacetate Taking into consideration the cyclododecene-(1)-ol-(3)-acetate which was still convertible into cis-trans-cyclododecadiene-(1,3) and the recovered cyclododecane-diol-(1,2)-diacetate made the yield of the desired cis-trans-cyclododecadiene-(1,3) 72% of the theoretical.

*Example III*

Using the same apparatus and procedure described in Example I, 100 g. of cyclododecene-(1)-ol-(3)-acetate were heated for a period of one hour at 500° C. under a pressure of 20 torr. The resulting reaction product was separated from the acetic acid present and upon distillation gave:

4.2 g. of unsaturated aliphatic hydrocarbons
15.9 g. of cis-trans-cyclododecadiene-(1,3)
53.0 g. of cyclododecene-(1)-ol-(3)-acetate.

This corresponded to a 46% yield of cis-trans-cyclododecadiene-(1,3) based on the reacted cyclododecene-(1)-ol-(3)-acetate.

Cis-trans-cyclododecadiene-(1,3), prepared as above described, is a valuable intermediate product for the production of diene derivatives with the $C_{12}$ ring, from which bicyclic dicarboxylic acids can be produced, when use is made of the dienophilic groups, e.g. maleic anhydride. The hydrogenated dicarboxylic acids are useful as polycondensation components and as starting materials for the production of synthetic lubricants.

In addition to using the acetic acid esters described in Examples I, II and III above, cis-trans-cyclododecadiene-(1,3) can similarly be produced in the same general type apparatus, substituting for the acetic acid esters the equivalent esters of the higher aliphatic carboxylic acids such as propionic, butyric, caproic, valeric, lauric and other acids, the operation being carried out substantially as described in the specific examples given above.

What is claimed is:

1. Process for the production of cis-trans-cyclododecadiene-(1,3) which comprises heating in a reactor to temperatures ranging from 300 to 650° C. a reactant selected from the group consisting of (A) diesters of cyclododecane-diol-(1,2) and monoalkanoic acids containing from 1 to 12 carbon atoms; (B) esters of cyclododecene-3-ol and an alkanoic acid containing 1–12 carbon atoms; and (C) a mixture of cyclododecane-diol-(1,2) and an excess of an alkanoic acid of 2–12 carbon atoms.

2. The process of claim 1 wherein the reaction is carried out at pressures ranging from 0.01 to 760 torr.

3. The process of claim 1 wherein the reactant is heated to temperatures ranging from 450 to 550° C.

4. The process of claim 1 wherein cyclododecane-diol-(1,2)-bis-acetate is the reactant.

5. The process of claim 1 wherein cyclododecene-ol-3 acetate is the reactant.

6. The process of claim 1 wherein the reaction is effected in the presence of an inert gas.

7. The process as defined by claim 1 wherein the reaction is conducted at pressures ranging from 1 to 40 torr.

8. The process as defined by claim 1 wherein the reactant comprises diesters of cyclododecane-diol-(1,2) with alkanoic acids of 1–12 carbon atoms.

9. The process as defined by claim 1 wherein the reactant comprises esters of cyclododecene-3-ol with an alkanoic acid of 1–12 carbon atoms.

10. The process as defined by claim 1 wherein the reactant is a mixture of cyclododecane-diol-(1,2) with an excess of an alkanoic acid of 2–12 carbon atoms.

References Cited

UNITED STATES PATENTS 3,093,693  6/1963  Perry _____ 260—666

OTHER REFERENCES

Chemical Abstracts, 1961, 55:27150 h.
Chemical Abstracts, 61:13209, 1964, A–C.
Index Chemicus, vol. 4, No. 4, Issue 40, Article No. 16120, February 1962, p. 32.
Migrdichian, Organic Synthesis, vol. 1, 1957, pp. 311–312.
Prelog et al., Helv. Chim. Acta. 1955, vol. 38, 1786–94.
Rotermund et al., Angew, Chem. 74 (9), 329, 1962.
Wagner et al., Synthetic Organic Chemistry, 1963, pp. 41–42.

LORRAINE A. WEINBERGER, *Primary Examiner.*

R. K. JACKSON, *Examiner.*

V. GARNER, *Assistant Examiner.*